Dec. 10, 1957  A. F. KRUEGER  2,816,233
ICE DETECTOR
Filed Jan. 28, 1954

INVENTOR
ALBERT F. KRUEGER
BY
ATTORNEY

United States Patent Office 2,816,233
Patented Dec. 10, 1957

2,816,233

ICE DETECTOR

Albert E. Krueger, Needham, Mass., assignor to Electronics Corporation of America, a corporation of Massachusetts Application January 28, 1954, Serial No. 406,788

4 Claims. (Cl. 250—83.3)

This invention relates to ice detectors. Under certain atmospheric conditions, a coating of ice can form very rapidly on the surface of aircraft, jamming controls and, in the case of jets, obstructing the air-intake ducts. It is therefore important that the formation of ice be detected rapidly in order to actuate the de-icing apparatus with which aircraft are equipped.

It is, therefore, an object of this invention to provide an ice detector the response of which is very rapid.

It is another object of this invention to provide an ice detector which is simple and economical to build.

In accordance with the illustrated embodiment of the present invention, use is made of the absorption characteristics of ice, which is practically opaque to infrared radiation having a wave length greater than 1.3 microns. A source of radiant energy containing infrared radiation directs a beam onto a photoelectric cell sensitive to infrared radiation. A filter which greatly attenuates radiation having a wave length less than 1.3 microns is positioned between the source of radiant energy and the photoelectric cell. With this filter alone interposed between the source and the photoelectric cell, infrared radiation having a wave length greater than 1.3 microns impinges upon the photoelectric cell. When ice is also interposed between the source and the photoelectric cell, infrared radiation having a wave length greater than 1.3 microns is greatly attenuated, and no radiation impinges upon the photoelectric cell. A control circuit which is responsive to this change of radiant energy impinging upon the photoelectric cell actuates the de-icing apparatus.

Other and incidental objects of the present invention will be apparent to those skilled in the art from a reading of the following specification and an inspection of the accompanying drawings in which.

Figure 1:
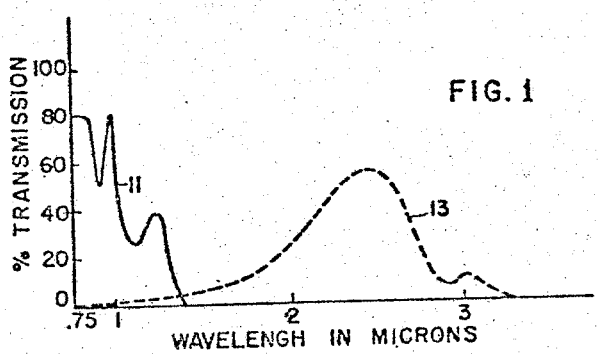
Figure 1 shows by means of a graph the near infrared transmission characteristics of ice and of a filter suitable for use in the ice detector of the present invention.

Referring to Figure 1, the curve 11 shows the transmission characteristics of ice in the near infrared region of the spectrum. It can be seen that ice absorbs radiation having a wave length greater than 1.3 microns and passes radiation having a wave length less than 1.3 microns. Curve 13 shows the transmission characteristics of a Corning No. 5113 filter which is practically opaque to radiation having a wave length less than 1.3 microns or greater than 3.3 microns.

Figure 2:
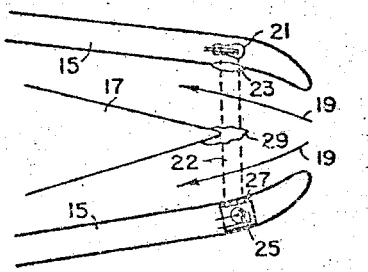
Figure 2 illustrates diagrammatically a proposed arrangement of the ice detector to protect the air-intake ducts of a jet aircraft.

Figure 2 is a cross-sectional view of the nose of a jet aircraft. Air ducts are provided between the outside walls 15 of the fuselage and the inner cone 17. When the aircraft is in motion, air rushes in the direction of arrows 19 toward the engine compartment. The air usually goes through a screen (not shown) to prevent stones and other solid objects from damaging the engine. The ice detector is so installed that it supervises a critical area of the aircraft, i. e., an area where ice formation usually starts. The screen and the tip of the inner cone 17 are examples of such critical areas, and Figure 2 shows an arrangement which supervises ice formation at the tip of the inner cone 17. A source of infrared radiation, such as an incandescent lamp 21, emits a beam 22 which is focused through a lens system 23 onto a photoelectric cell 25. A Corning No. 5113 filter 27 intercepts the beam 22 before it reaches the photoelectric cell 25.

With the filter 27 interposed between the light source 21 and the photocell 25, infrared radiation lying in the range from 1.3 to 3.3 microns impinges upon the photocell 25. When ice 29 intercepts the beam 22, by forming at the tip of the inner core 17 or on the walls 15, radiation above 1.3 microns is absorbed by the ice and prevented from impinging upon the photocell 25 which is therefore in the "dark."

Figure 3:
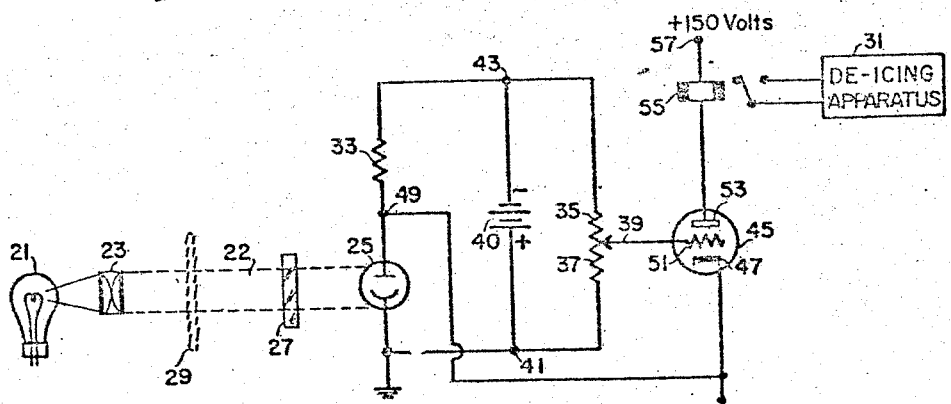
Figure 3 is a circuit diagram of an embodiment of the ice detector in accordance with the present invention.

Figure 3 shows a suitable control circuit to actuate the de-icing apparatus 31. The photoelectric cell 25 is a lead sulfide photoconductive cell and is connected in a bridge circuit comprising the cell 25, resistor 33, and the two sections 35 and 37 of a potentiometer having a tap 39. A battery 40 is connected across terminals 41 and 43 of the bridge. An electron valve or tube 45 has its cathode 47 connected to the junction 49 of photocell 25 and resistor 33, its control grid 51 connected to tap 39, and its anode 53 connected through a relay 55 to the power supply terminal 57.

The operation of the control circuit of Figure 3 is as follows: with no ice in the path of the beam 22, radiant energy impinges upon the photocell 25, the resistance of which is therefore lowered. The potential at junction point 49 has a given negative value with respect to ground, and the potential at the control grid 51, which is also negative, is adjusted by means of tap 39 so that tube 45 does not conduct. When radiant energy is prevented from impinging upon the photocell 25 by the formation of ice 29 in the path of the beam 22, the resistance of photocell 25 is increased, and the potential at junction point 49 becomes more negative. This reduces the bias on tube 45 which becomes conductive. Conduction through tube 45 closes the relay 55 which actuates the de-icing apparatus 31.

I claim:

1. An ice detector comprising: a source of radiation, a radiation-sensitive device, and a filter positioned between said source and said radiation-sensitive device, said filter attenuating wave lengths passed by ice and passing wave lengths absorbed by ice.

2. An ice detector comprising: a source of infrared radiation, photoelectric means sensitive to said infrared radiation, and filter means positioned between said source and said photoelectric means, said filter means attenuating infrared radiation having wave lengths below 1.3 microns.

3. An ice detector comprising: a source of infrared radiation over a band including wave lengths passed by ice and wave lengths absorbed by ice, photoelectric means sensitive to infrared radiation within said band, and filter means positioned between said source and said photoelectric means, said filter means passing the wave lengths absorbed by ice and attenuating the wave lengths passed by ice.

4. An ice detector comprising: a source of radiation, photoelectric means sensitive to a given band of said radiation, and filter means positioned between said source and said photoelectric means, said filter means attenuating radiation within said band which is passed by ice.

References Cited in the file of this patent

UNITED STATES PATENTS

| | | |
|---|---|---|
| 2,237,193 | Mobsby | Apr. 1, 1941 |
| 2,275,745 | Eastman | Mar. 10, 1942 |
| 2,412,165 | McDermott | Dec. 3, 1946 |
| 2,480,846 | Friedman et al. | Sept. 6, 1949 |
| 2,525,638 | Blout et al. | Oct. 10, 1950 |